July 30, 1946.　　　　G. C. MONACO　　　　2,404,882
ARTICLE HANDLING APPARATUS
Filed Feb. 25, 1943　　　3 Sheets-Sheet 1
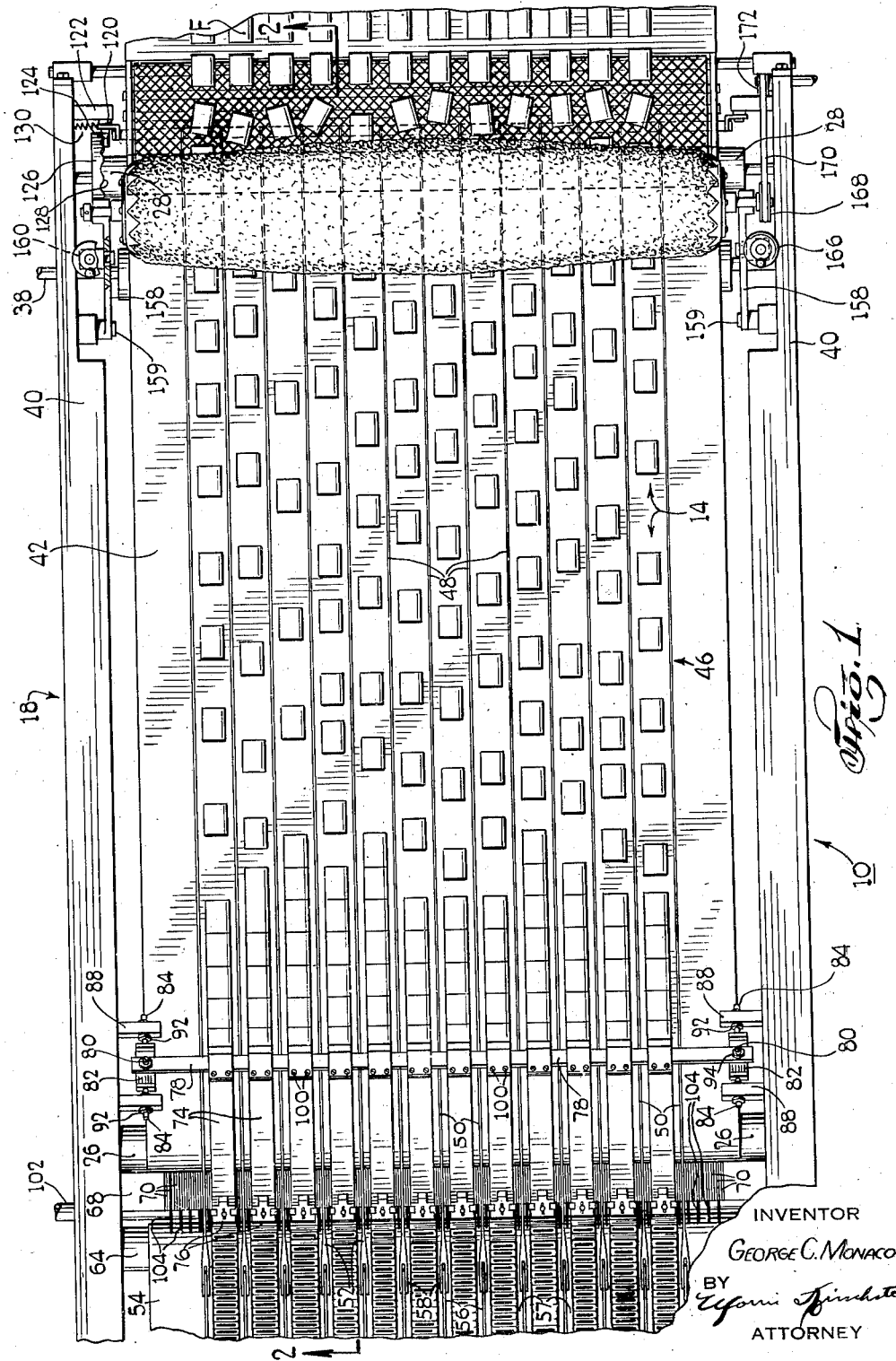

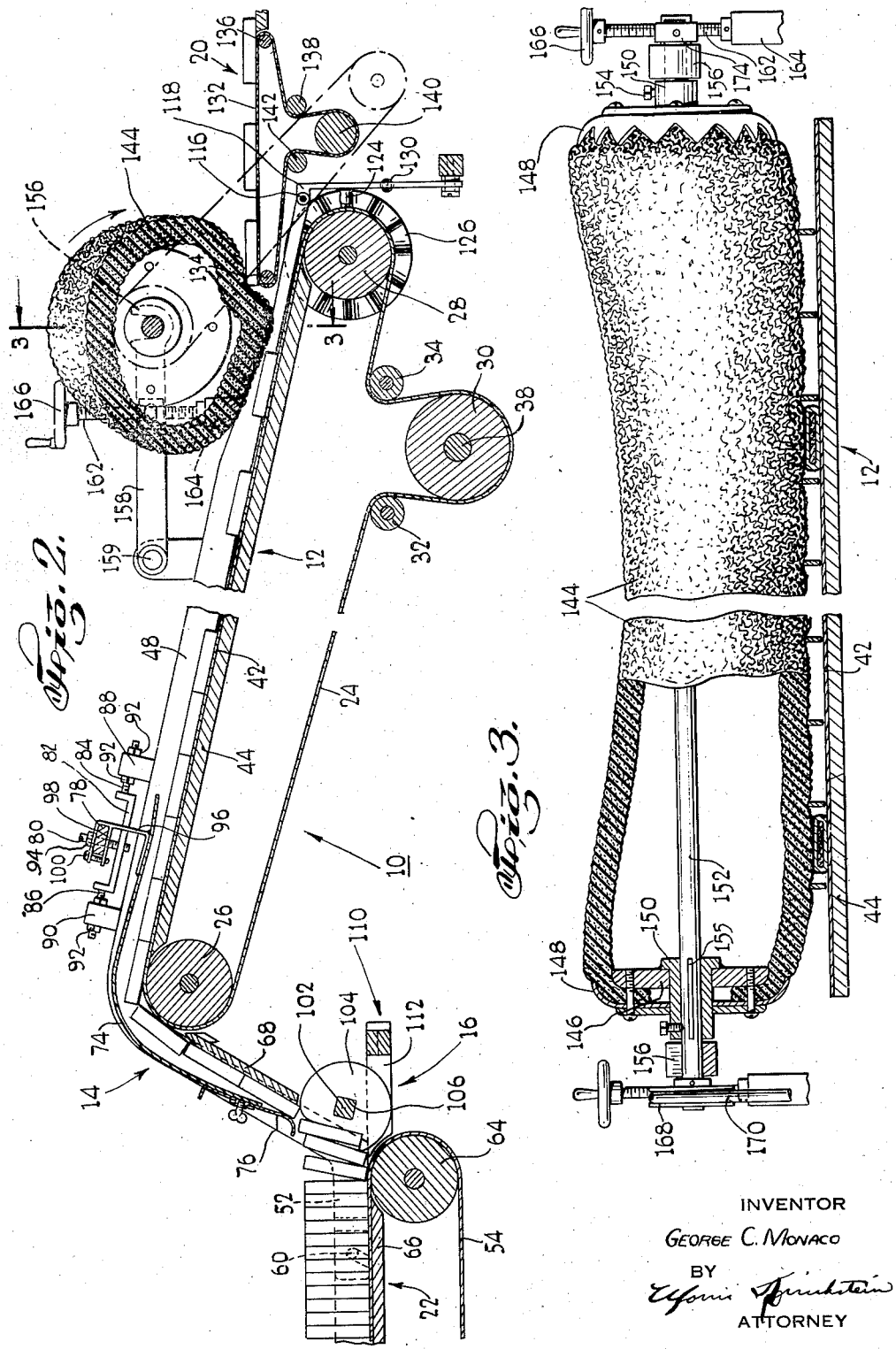

July 30, 1946.  G. C. MONACO  2,404,882
ARTICLE HANDLING APPARATUS
Filed Feb. 25, 1943  3 Sheets-Sheet 3
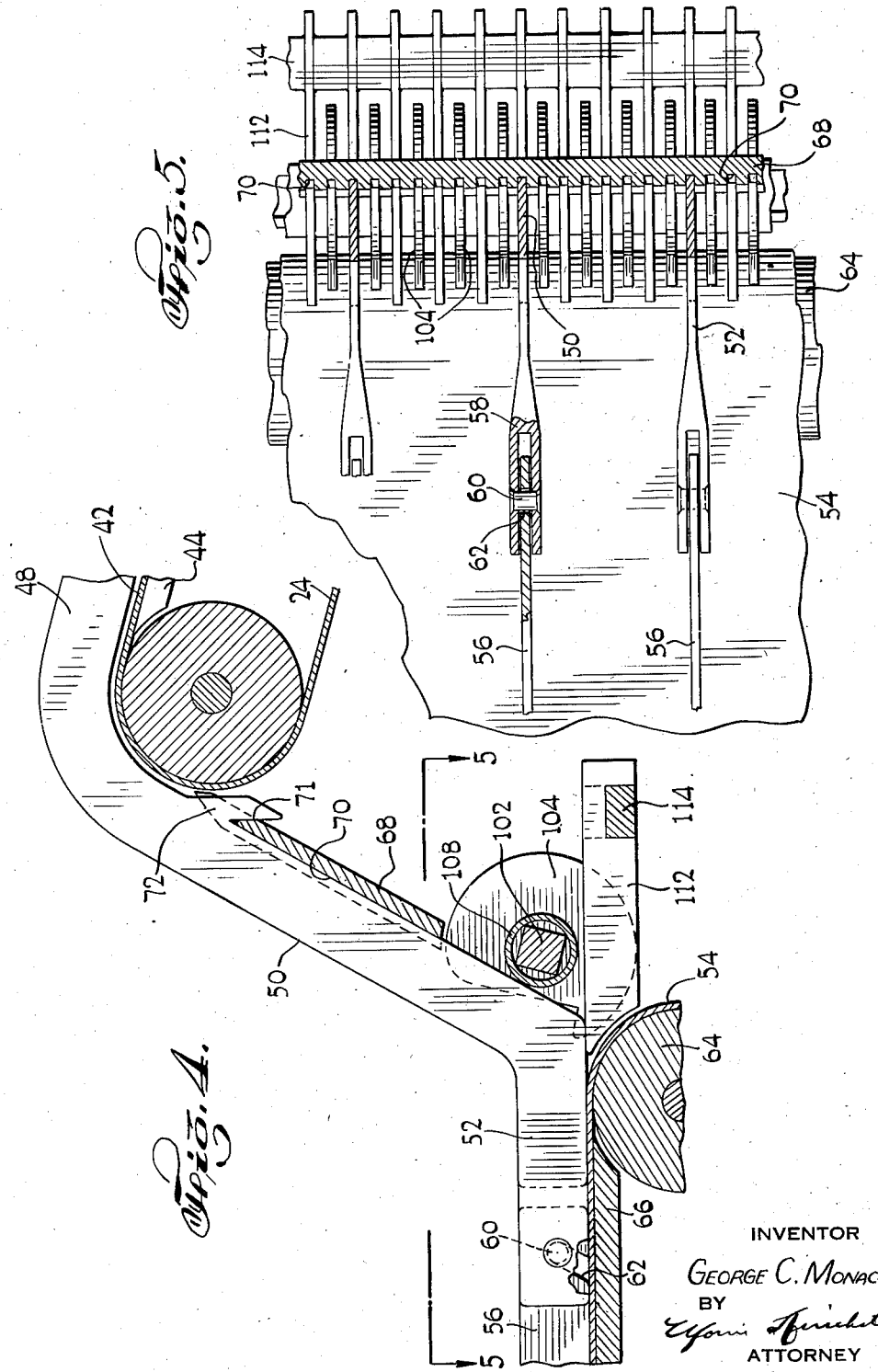
INVENTOR
GEORGE C. MONACO
BY
ATTORNEY Patented July 30, 1946

2,404,882

UNITED STATES PATENT OFFICE 2,404,882

ARTICLE HANDLING APPARATUS

George C. Monaco, Douglaston Hills, N. Y.

Application February 25, 1943, Serial No. 477,009

14 Claims. (Cl. 198—34)

This invention relates to article handling apparatus. More particularly the invention is directed to an apparatus for transferring baked objects, such as crackers, biscuits, fig bars and the like from flat position on a cooling conveyor to stacked upright position on a packing conveyor.

In my copending application, Serial No. 450,011, for Stacking machines, filed July 7, 1942, I have disclosed a stacking apparatus having a conveyor belt on which cookies delivered from a cooling conveyor are received and raised above a stacking cam which discharges the cookies on a stationary grating. As cookies accumulate upon the grating they are pushed forward on to a packing conveyor which carries them to packing operators.

It is an object of the present invention to improve the stacking apparatus disclosed in my said copending application so as to deposit cookies at a more uniform rate upon the stacking conveyor belt and feed cookies at a more uniform rate into the stacking cam.

Another object of the invention is to provide a novel means for facilitating the transfer of cookies from the cooling conveyor belt to the stacking conveyor belt and for expediting the distribution of the cookies into a plurality of troughs, one of which is associated with each set of stacking cams. In this connection an ancillary object of the invention is to provide a means of the character described which will prevent jamming of cookies at the point where they are transferred to the stacking conveyor belt.

A further object of the invention is to modify the delivery end of the stacking machine and associated receiving end of the packing conveyor so as to eliminate the deposit of cookies upon a stationary element when they are discharged from the stacking cam, thereby lengthening the period the machine can operate before cleaning is required.

An additional object of the invention is to provide an apparatus of the character described such that cookies with exposed jam centers will travel on a moving support and any jam deposited on such support will not accumulate, thus preventing any interference with the operation of the apparatus and frequent stoppage for cleaning purposes.

Another object of the invention is to provide an apparatus of the character described which shall have the foregoing advantages and yet operate in a highly efficient and satisfactory manner with but few changes in the apparatus illustrated and described in my said copending application.

Other objects of the invention will in part be obvious and in part hereinafter pointed out.

The invention accordingly consists in the features of construction, combinations of elements and arrangement of parts which will be exemplified in the construction hereinafter described and of which the scope of the application will be indicated in the appended claims.

Certain features of the invention, shown and/or described, but not claimed herein, are shown, described and claimed in my divisional application for Article handling apparatus, Serial No. 541,956, filed June 24, 1944.

In the accompanying drawings in which there is shown one of the various possible embodiments of the invention, Fig. 1 is a top plan view of a stacking machine and receiving end of a packing conveyor system all embodying the invention, and showing also the discharge end of a cooler conveyor system;

Fig. 2 is an enlarged fragmentary sectional view taken substantially along the line 2—2 of Fig. 1;

Fig. 3 is a fragmentary view in partial section taken substantially along the line 3—3 of Fig. 2;

Fig. 4 is an enlarged vertical sectional detail view of the delivery end of the stacking machine and associated receiving end of the packing conveyor; and Fig. 5 is a fragmentary sectional view taken substantially along the line 5—5 of Fig. 4.

Referring now in detail to the drawings, I have there shown a stacking machine 10 in the process of arranging cookies such as fig bars F having fig jam centers enclosed in an open-ended covering of baked sweetened dough. Said machine may have the same general construction as that shown and described in my said copending application and comprises a receiving table 12, a series of cookie feeding troughs 14, and a means 16 for stacking the cookies, all supported on a frame 18. The receiving end of the stacking machine is disposed below the discharge end of an article processing machine such as a cooling conveyor system 20, and the discharge end of the stacking machine terminates at the receiving end of an article moving machine such as a conveyor packing system 22.

The receiving table 12 comprises an inclined endless conveyor belt 24 which travels over an upper roller 26, a lower roller 28, a driving roller 30 and a pair of take-up and idling rollers 32, 34. The driving roller 30 is fixed to a shaft 38, turned from a source of power (not shown) which may comprise the same source of power as that employed to actuate the packing and cooling conveyor systems 20, 22. All of said rollers 26, 28, and 30 are journalled in side pieces 40 of the frame 20.

The upper run 42 of the belt 24 is supported by an inclined plate 44 extending between the side pieces 40 and terminating at arcuate ends closely overlying the rollers 26, 28. The top surface of this run of the conveyor belt is broken up into the cookie feeding troughs 14 by a plurality of parallel spaced separator strips 46 especially constructed in accordance with the present invention. Each of these strips includes a slightly inclined portion 48 which overlies the top run 42 of the conveyor belt, a steeply inclined portion 50 which forms part of a stacking cam feeding chute, and a horizontal portion 52 which overlies the receiving end of a packing conveyor belt 54. The terminal of each horizontal portion 52 is provided with suitable means for rapid detachable attachment to a separator strip 56 which overlies the belt 54 and assists in providing a series of troughs 57 in the packing conveyor system. Said attaching means may comprise a yoke 58 on the free end of the horizontal portion 52 which has a transverse pin 60 centrally disposed between the yoke arms. This pin is adapted to be slidably received in a slot 62 cut in the strip 56 near the stacking machine and sloped away therefrom. The pin 60 will normally remain in the slot 62 since the other end of the strip 56 in machines of this type is held by a spring (not shown) which urges the strip 56 away from the stacking machine.

By employing the foregoing construction of separator strips 46, 56, I am able to place one of the rollers 64, for the packing conveyor belt 54 immediately beneath the point where cookies are discharged from the stacking means 16. There is thus provided a moving surface beneath the fig bars which after stacking rest upon an end on which the jam center is exposed.

The packing conveyor belt 54 may conventionally have its upper run supported on a horizontal plate 66. The far end of the conveyor belt 54 is supported on another roller (not shown) horizontally aligned with the roller 64 and one of these rollers may be driven from the common source of power.

The steep portion 50 of each stacking separator strip 46 is supported on a slide comprising a steeply inclined stationary plate 68 down which fig bars gravitate to the stacking means 16 after leaving the receiving belt 24. In order to accommodate the separator strips 46, the upper surface of said slide plate 68 has a plurality of spaced parallel slots 70 therein in which the strip portions 50 are snugly received. In addition, channels 71 are cut through a portion of the plate 68, for example the top edge, to form a plurality of vertical extending holes, one in each slot 70. These holes are adapted to receive and hold an integral leg 72 pendant from the steeply inclined portion 50 of each separator strip 46. By disposing the leg 72 in this fashion I am able to securely anchor the stacking and packing separator strips and to prevent the forward portion 52 of the stacking separator strip from pressing heavily on the packing conveyor belt 54. The lower edge of the slide plate 68 terminates immediately above the stacking means 16, and said plate is supported on the side frame pieces 40.

As shown in my copending application, the troughs formed by the steeply inclined portions 50 of the separator strips and the slide plate 68 are enclosed to provide steep feeding chutes by topping strips 74 of form-maintaining sheet material. Each strip 74 is so constructed and arranged that it has a portion lying parallel to and spaced from that portion of the top run 42 of the stacking conveyor belt which approaches the top roller 26. Each strip also has a portion overlying, spaced from and substantially parallel to the steeply inclined plate 68.

An auxiliary plate 76 attached to the lower end of each of the strips 74 enables adjustment to be made of the position of the discharge end of the feeding chutes.

The topping strips are supported by a common positioning means comprising a non-circular rod 78 which extends across the full width of the stacking machine. At its two ends said rod is threadedly received on bolts 80, which are freely rotatably supported on shallow U-brackets 82. The upturned ends of the brackets are caught between pairs of threaded rods 84, 86 each of which freely passes through a bore in one of a pair of spaced lugs 88, 90 projecting from the side pieces 40. The rods 84, 86 have nuts 92 threaded on their opposite ends and adapted to be tightened against opposite surfaces of the lugs 88, 90. When it is desired to adjust that portion of the strips 74 overlying the top run of the stacking conveyor belt 24, lock nuts 94, which are threaded on the bolts 80, are loosened to permit said bolts to be turned. This will move the strips 74 towards or away from the belt 24. To adjust the strip relative to the steep plate 68, the nuts 92 are loosened and the screw rods 84, 86 manipulated.

Each topping strip 74 has a light channel 96 welded thereto. One flange of said channel lies parallel to the topping strip and is spaced from a plate 98, suitably held to the main channel web. This plate and the channel flange just mentioned are adapted to receive the rod 78 therebetween. Screws 100 draw the plate and flange together to firmly anchor the topping strip 74 to said rod.

The means 16 for vertically stacking fig bars F received from the steep chute comprises a shaft 102 having a non-circular portion extending across the machine 10. The ends of the shaft are rotatably journalled in the side frame pieces 40 where it may be driven by the common source of power. Mounted for rotation with said shaft are a plurality of registered stacking plate cams 104, having central apertures 106 which match the non-circular contour of said shaft. Said stacking cams are maintained in spaced position along the shaft 102 by collars 108. Several stacking cams are employed in conjunction with each trough 14, the exact number being controlled by the type and width of cookie and varying from two to six or more. As a rule, one cam is placed between each of the slots 70 in the slide plate 68 so that the stacking separator strips 46 can pass in operative position through the stacking means.

The cams 104 are of any suitable shape and may, as shown in my copending application, comprise a portion of constant radius which blocks off the discharge end of the feeding chute when positioned thereunder; another portion consisting of a deep indentation in the periphery of the cam and which is of sufficient size to receive a single cookie; and a portion of varying radius intermediate the indented and the constant radius portion, said intermediate portion being adapted upon rotation of the cam in a counter-clockwise direction (as viewed from Figs. 2 and 4) to press the cookie toward the left. The lower halves of the cams 104 below the shaft 102 are sandwiched in a grating 110 comprising several short parallel bars 112, supported on a cross-rod 114 extending between the side pieces 40. The bars 112 have their top edges entering between adjacent cams 104 and running substantially up to the conveyor roller 64, being in horizontal alignment with the top run of the packing conveyor belt 54. These bars are employed to arrest the downward descent of a cookie disposed in the indentations of a set of stacking cams at the time it reaches the level of the packing conveyor belt so that it may thereafter be pushed on to said belt by the intermediate portion of the cam. It will be appreciated that due to the constant rotation of the cams therebetween there will be no tendency to accumulate fig jam on the bars 112.

Note should be taken of the fact that the tips of the grating bars 112 terminate substantially at the extreme outer periphery of the stacking cams 104 in contrast with prior practice in this art, wherein the grating bars extended for a substantial distance beyond the stacking cams in order to provide a stationary support for the packing separator strips 56 as shown in my copending application. This shortening of the grating bars and concomitant advantageous relocation of the packing conveyor belt roller 64 immediately adjacent the stacking cams is only possible because the packing separator strips 56 in the present invention are no longer supported by a stationary structural element over and on which the cookies pass subsequent to stacking but by an element, such as a separator strip 46 of the stacking machine, which is not contacted by the under surface of the stacked cookies.

At the receiving end of the conveyor belt 24 the stacking separator strips 46 are all pivotally attached by pins 116 to a shake bar 118, which has a reciprocatory motion imparted thereto in order to cause cookies, discharged upon the belt 24 by the cooling conveyor system 20, to be directed into one of the troughs 14. The shake bar carries rollers 120 at both ends thereof which are received in horizontal slides in guide blocks 122 extending from the side frame pieces 40. An additional roller 124, fixed to the shake bar 118, is adapted to ride upon the face of a cam 126 rotative with the belt pulley 28. Said cam has a plurality of lobes 128 adapted to cooperate with the roller 124 for rapidly reciprocating the shake bar 118 and separator strips 46. The roller 124 is maintained in contact with the cam 126 by a spring 130.

It will be noted that the ends of the stacking separator strips 46 adjacent the receiving end of the stacking machine conveyor belt 24 are reduced from their full height, this construction being employed to facilitate the dispersal into the troughs 14 of cookies delivered from the article processing system 20.

Said system may be of any type known to the art, and for example may comprise a machine wherein a series of pans or trays are moved in a serpentine manner through a cooling maze and are caused to deposit cookies upon a discharge conveyor belt 132, traveling around a plurality of rollers 134, 136, 138, 140, 142. The foremost roller 134 overlies the top run 42 of the stacking machine conveyor belt 24. The roller 140 serves as a drive, being actuated by the common source of power. The rollers 138 and 142 serve as idlers and takeups. The roller 136 defines the rearmost position of the belt. Due to the short length of the belt 132 and the sharp turns it is required to make, it is customary to make this belt of metal fabric.

Although I have described this portion of the article processing system in some detail, it should be understood that any type of system may be employed in conjunction with the stacking machine embodying the invention, provided only that the system discharges cookies flat and ready for stacking upon the top run 42 of the stacking conveyor belt 24.

Heretofore, cookies delivered by cooling conveyor systems to stacking machines having separator strips and means for reciprocating the same, as described hereinabove, tended to jam and accumulate at the point of delivery of the cooling conveyor system, despite shaking of the separator strips and continuous movement of the receiving belt 24. It has been necessary, before the present invention was adopted, to have operators permanently stationed at the delivery end of the cooling conveyor system whose sole duty it was to break up piles of cookies which accumulated as soon as jamming took place and to direct the massed cookies into the proper troughs. Even though the operators became highly skilled at this work, the tendency of the cookies to jam and accumulate prevented an even flow thereof onto the receiving belt 24 so that in practice troughs 14 were often empty all the way to a stacking cam before the pile of jammed cookies could be broken up. This, obviously, materially detracted from the efficiency of the machine and considerably added to the cost of operating the same.

In accordance with the present invention, I have overcome the foregoing difficulty by providing a means for adding additional impetus to the cookies as they are transferred from the discharge end of an article processing system onto the receiving belt 24. Such means causes the cookies to clear the gap between the article processing system and the belt of the stacking machine, and, by being arranged to contact the cookies after they are on the receiving belt, prevents cookies from jamming at this point and forcefully delivers them into the proper troughs. When a cookie accidentally lands upon one of the separator strips, said means holds the cookie against reciprocation so that the separator strip can move out from under the cookie permitting it to fall into a trough.

Said means preferably comprises an over-riding drive, that is, a mechanism having a moving surface which is adapted to frictionally engage the upper surface of cookies lying on the cooling conveyor system and the stacking conveyor belt. Any conventional type of over-riding drive can be employed, such for example as a wire brush, an endless belt, or a rubber drum, the latter mechanism being illustrated in the disclosed embodiment of the invention. Said drum comprises a hollow cylindrical roll 144, whose operative surface is fabricated from a sheet of soft resilient rubber. The ends of the roll are turned and clamped between discs 146 and an end-forming plate 148. The plates and discs are apertured to receive bushings 150 through which a shaft 152 extends. The bushings are provided with set screws 154 which bite into said shaft 152. If desired, the shearing strain on the set screw tips may be relieved by employing keys 155 disposed in keyways in the bushings and shaft. This structure facilitates tensioning of the roll 144 and minimizing sag of the soft rubber sheet.

The ends of the shaft which project beyond the bushings 150 are cradled in open bearings 156 formed on the ends of cradle links 158. Said links are pivotally mounted on the side pieces 40 by pins 159.

Means is provided to adjust the horizontal position of the roll. Said means may comprise bearing blocks 160, one of which is pivotally affixed to each of the cradle links 158. Each of said blocks threadedly engages a vertical screw shaft 162 whose lower end is rotatably mounted in a step bearing 164 carried by a side piece 40. The shafts 162 are turned by hand wheels 166.

Means is also provided to rotate the roll shaft 152. Said means may comprise a sheave 168 fixed to an end of the shaft 152 and driven by a belt 170 from a sheave 172, rotatably journalled in a side piece 40 and actuated by the common source of power. The belt 170 is preferably resilient so that horizontal adjustment of the roll 144 can be effected without placing undue strain upon the bearings 156 or sheave 172, or unduly slackening said belt.

The drive sheave 168 has a hub disposed adjacent one of the open bearings 156 and a collar 174 is pinned to the shaft 152 adjacent the other of the open bearings so as to prevent axial shifting of said shaft.

To set the machine for operation the hand wheels 166 are so manipulated that the under surface of the roll 144 will lightly lie upon the top surface of a cookie at the end of the cooling conveyor discharge belt 132 as well as upon a cookie at the receiving end of the stacking machine conveyor belt 24. This ensures coverage of all points where jamming is likely to occur. It is not absolutely essential, however, to contact cookies at the end of the belt 132, if the under surface of the roll 144 is so arranged as to prevent jamming of cookies after they have left the same. Due to the resiliency of the roll 144, cookies which are accidentally deposited atop the separator strips 46 and which are overridden by said roll will not be deformed or broken, but are prevented from reciprocation while such strips are shifted out from beneath the same whereupon the cookie will be forced into a trough 14 by the roll.

The speed of rotation of the roll 144 is so regulated, either by adjusting the rate of angular rotation of the sheave 172 or by selecting sheaves 168, 172 of proper diameter, that the linear speed of the surface of the roll 144 is slightly greater than the linear speed of the stacking machine conveyor belt 24. I have found that a speed increase of five per cent will give satisfactory results. It will be understood by the art that the linear speed of the roll 144 will also be greater than the linear speed of the delivery cooling system conveyor belt 132 since it is standard practice in the cookie stacking field to have the stacking machine conveyor belt 24 traveling faster than the delivery belt 132 for the cooling conveyor system.

It will thus be seen that there is provided a device and method for operating the same in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:

1. For use with an article handling machine having a conveyor belt adapted to receive articles discharged from a delivery system by a means forming part of said system, and which means propels articles out of said system and on to said belt: means to prevent jamming of articles at their point of delivery to the belt, said means comprising an over-riding drive mechanism in contactual relationship with and for accelerating articles as they are discharged by said propelling means from said delivery system and received on said belt.

2. For use with an article handling machine having a receiving conveyor belt on which articles are discharged from the conveyor belt of a delivery system which, at the point of discharge, is disposed above the receiving conveyor belt: means to prevent jamming of articles at their point of delivery to the receiving belt, said means comprising an over-riding drive mechanism for engaging articles as they are discharged from said delivery system and deposited on the receiving belt and causing them to move at such time at a speed greater than that at which either of said belts moves the articles.

3. For use with an article handling machine having a receiving conveyor belt on which articles are discharged from the conveyor belt of a delivery system which, at the point of discharge, is disposed above the receiving conveyor belt: means to prevent jamming of articles at their point of delivery to the receiving belt, said means comprising an over-riding drive mechanism for accelerating articles as they are discharged from said delivery system and deposited on said receiving belt by frictionally contacting the upper surfaces of the articles with an element moving in the direction of travel of the articles and at a speed greater than that at which either of said belts moves the articles.

4. For use with an article handling machine having a receiving conveyor belt on which articles are discharged from the conveyor belt of a delivery system which, at the point of discharge, is disposed above the receiving conveyor belt: means to prevent jamming of articles at their point of delivery to the receiving belt, said means comprising an over-riding drive mechanism for accelerating articles as they are discharged from said delivery system and deposited on said receiving belt by frictionally contacting the upper surfaces of the articles with an element moving in the direction of travel of the articles and at a speed greater than that at which either of said belts moves the articles, and means to actuate said over-riding drive mechanism.

5. For use with an article handling machine having a conveyor belt adapted to receive articles discharged from a delivery system by a means forming part of said system, and which means propels articles out of said system and on to said belt: means to prevent jamming of articles at their point of delivery to the belt, said means comprising an over-riding drive mechanism for accelerating articles as they are discharged from the delivery system and deposited on the receiving belt by frictionally contacting the upper surface of the articles with a rotary element, the contacting surface of which moves in the direction of travel of the articles and at a speed greater than that at which either the propelling means of the delivery system or the belt moves the articles, and means to revolve said rotary element.

6. A combination as set forth in claim 5 wherein the rotary element comprises a cylinder having a yielding surface.

7. A combination as set forth in claim 5 wherein the rotary element comprises a hollow cylinder having a yielding surface.

8. A combination as set forth in claim 5 wherein the rotary element comprises a cylinder having an axis of rotation spaced from the receiving belt and disposed perpendicularly to the direction of travel thereof.

9. A combination as set forth in claim 5 wherein the rotary element comprises a tube of soft rubber.

10. For use with an article handling machine having a conveyor belt adapted to receive articles discharged from a delivery system by a means forming part of said system, and which means propels articles out of said system and on to said belt: means to prevent jamming of articles at their point of delivery to the belt, said means comprising an over-riding drive mechanism for accelerating articles as they are discharged from the delivery system and deposited on the receiving belt by frictionally contacting the upper surfaces of the articles with an element moving in the direction of travel of the articles and at a speed greater than that at which either the delivery system or the belt moves the articles, means to actuate the over-riding mechanism, and means to vary the spacing between said element on the one hand and the discharging end of said delivery system and the receiving belt on the other.

11. For use with an article handling machine having a conveyor belt adapted to receive articles discharged from a delivery system by a means forming part of said system, and which means propels articles out of said system and on to said belt: means to prevent jamming of articles at their point of delivery to the belt, said means comprising an over-riding drive mechanism for accelerating articles as they are discharged from the delivery system and deposited on the receiving belt by frictionally contacting the upper surface of the articles with a rotary element, the contacting surface of which moves in the direction of travel of the article and at a speed greater than that at which either the delivery system or the belt moves the article, means to revolve said rotary element, and means to vary the spacing between the axis of rotation of the rotary element on the one hand and the discharge end of the delivery system and the receiving belt on the other.

12. For use with an article stacking machine having a receiving conveyor belt adapted to have deposited thereon articles discharged from a delivery system, and which belt is broken up into a plurality of parallel troughs extending in the direction of travel of the belt by a plurality of spaced separator strips overlying said belt and extending in the direction of travel thereof: means to prevent jamming of articles at their point of delivery from said system, said means comprising an over-riding drive mechanism for accelerating articles as they are discharged from the delivery system and deposited on the receiving belt by frictionally contacting the upper surfaces of the articles with an element moving in the direction of travel of the articles at a speed greater than that of the delivery system or the belt, said element having a yielding surface contacting said articles whereby said surface may be readily deformed by articles which lie atop the separating strips.

13. For use with an article stacking machine having a receiving conveyor belt adapted to have deposited thereon articles discharged from a delivery system, and which belt is broken up into a plurality of parallel troughs extending in the direction of travel of the belt by a plurality of spaced separator strips overlying said belt and extending in the direction of travel thereof, the strips being reciprocated transversely of the direction of travel of the receiving belt: means to prevent jamming of articles at their point of delivery from said system, said means comprising an over-riding drive mechanism for accelerating articles as they are discharged from the delivery system and deposited on the receiving belt by frictionally contacting the upper surfaces of the articles with an element moving in the direction of travel of the articles at a speed greater than that of the delivery system or the belt, said element having a yielding surface contacting said articles whereby said surface may be readily deformed by articles which lie atop the separating strips so as to prevent reciprocation of such articles with the strips and allow the strips to shift out from beneath the same and the articles to be forced into the troughs.

14. For use with an article handling machine having a conveyor belt adapted to receive articles discharged from a delivery system by a means forming part of said system, and which means propels articles out of said system and on to said belt: means to prevent jamming of articles at their point of delivery to the belt, said means comprising an over-riding drive mechanism for accelerating articles as they are discharged by said propelling means from said delivery system and as they are received on said belt by frictionally contacting the upper surfaces of the articles with a flexible continuous member, the contacting surface of which moves in the same general direction as the direction of travel of the articles at a speed greater than that of the delivery system or the belt.

GEORGE C. MONACO.